(12) United States Patent
Kandath et al.

(10) Patent No.: US 12,033,188 B2
(45) Date of Patent: Jul. 9, 2024

(54) SYSTEMS AND METHODS FOR PERFORMING USER SEGMENTATION AND RECOMMENDING PERSONALIZED OFFERS AT REAL TIME

(71) Applicant: Tata Consultancy Services Limited, Mumbai (IN)

(72) Inventors: Lakshmidevi Kandath, Chennai (IN); Abhinaya Sekar, Chennai (IN); Syed Abdus Samy Munshi, Chennai (IN); Ravindran Rethinam, Chennai (IN); Srivatsan Murali, Chennai (IN); Mohammad Imran Kamdar, Chennai (IN); Mahmood Zayeem Mustafa Naina, Chennai (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 0 days.

(21) Appl. No.: 18/121,259

(22) Filed: Mar. 14, 2023

(65) Prior Publication Data
US 2023/0306471 A1    Sep. 28, 2023

(30) Foreign Application Priority Data
Mar. 24, 2022    (IN) .............................. 202221016590

(51) Int. Cl.
*G06Q 30/0251* (2023.01)
*G06Q 30/0204* (2023.01)

(52) U.S. Cl.
CPC ..... *G06Q 30/0271* (2013.01); *G06Q 30/0204* (2013.01); *G06Q 30/0264* (2013.01)

(58) Field of Classification Search
CPC ........... G06Q 30/0271; G06Q 30/0204; G06Q 30/0264; G06Q 30/0222; G06Q 30/0631; G06Q 30/0251
See application file for complete search history.

(56) References Cited

U.S. PATENT DOCUMENTS 9,595,043 B2    3/2017 Roeding et al.
11,107,109 B2   8/2021 Qi et al.
(Continued)

OTHER PUBLICATIONS

Rahmani, "Recommender system based on customer segmentation (RSCS)," 45(6) (2016).
(Continued)

*Primary Examiner* — Alexandru Cirnu
(74) *Attorney, Agent, or Firm* — FINNEGAN, HENDERSON, FARABOW, GARRETT & DUNNER LLP

(57) ABSTRACT

Offers and optimization have co-existed since long and industry has several solutions to address this need. However, identifying the right customer to target offers, assigning the right offer only when customer requires it and presenting offers even on long tail product is crucial to a successful offer assignment. Present application provides systems and methods that creating potential segments where in each user fits into any of the segments based on purchase history, navigation/behavior through e-commerce portal, demographics, and look-ahead scores. When a trigger is received in real-time, the system generates optimal real-time product recommendations for the users by eliminating popularity bias, based on his/her most recent product clicks in the e-commerce portal using a recommender system. Further, offers are mapped to the optimal real-time product recommendations using a scoring mechanism to generate and provide next optimal offers wherein the next optimal offers are generated based on configurable constraint(s).

12 Claims, 3 Drawing Sheets

(56) References Cited

U.S. PATENT DOCUMENTS

| | | | |
|---|---|---|---|
| 2012/0059707 A1* | 3/2012 | Goenka | G06Q 30/0241 705/14.67 |
| 2014/0222506 A1* | 8/2014 | Frazer | G06Q 30/02 705/7.29 |
| 2016/0117703 A1* | 4/2016 | Woddi | G06Q 30/0204 705/7.33 |
| 2016/0379254 A1 | 12/2016 | Ray et al. | |
| 2021/0150548 A1* | 5/2021 | Dua | G06F 18/2113 |
| 2023/0101928 A1* | 3/2023 | Pande | G06N 5/04 705/26.7 |

OTHER PUBLICATIONS

Vinod et al., "An approach to offer management: maximizing sales with fare products and ancillaries," J Revenue Pricing Manag (2018).

* cited by examiner

SYSTEMS AND METHODS FOR PERFORMING USER SEGMENTATION AND RECOMMENDING PERSONALIZED OFFERS AT REAL TIME

PRIORITY CLAIM

This U.S. patent application claims priority under 35 U.S.C. § 119 to: India Application No. 202221016590, filed in India on Mar. 24, 2022. The entire contents of the aforementioned application are incorporated herein by reference.

TECHNICAL FIELD

The disclosure herein generally relates to techniques for segmenting users, and personalizing offers, and, more particularly, to systems and methods for performing user segmentation and recommending personalized offers at real time.

BACKGROUND

Offers and optimization have co-existed since long and industry has several solutions to address this need. However, identifying the right customer to target offers, assigning the right offer only when customer requires it and presenting offers even on long tail product is crucial to a successful offer assignment. For instance, Customer A would buy product 1 even without an offer if the brand/other attributes are aligning with his preferences. However, Customer B is sensitive to price changes and would buy a product only if offer is provided to him. The common problems are as follows: (a) In a bid to attract customers Retailers and Consumer product companies, provide offers which most of the times result in eroded margins to retailers. Not assigning the right offers to the right customers at right time, providing offers even when not required for a customer, results in loss to large retail companies. (b) Traditional systems require a large amount of data to build a comprehensive solution. Building a solution with minimal breadth of data is the key. (c) Most of the offers assigned to customers are related to popular products. Profiting from promoting Long Tail (LT) products is a proven strategy for improved sales. In an ecommerce platform, LT is flatter and longer. It has been observed that customer engagement is much more in some categories like Books and Media, large LT list (99%), and LT.

SUMMARY

Embodiments of the present disclosure present technological improvements as solutions to one or more of the above-mentioned technical problems recognized by the inventors in conventional systems.

For example, in one aspect, there is provided a processor implemented method for personalization of offers. The method comprises receiving, via one or more hardware processors, an input data comprising information corresponding to a plurality of users, one or more associated transactions, one or more clickstreams associated with one or more items, and one or more offers; computing, via the one or more hardware processors, a look-ahead score for at least one of a potential sale, a likelihood of churning of the plurality of users, and a subsequent user arrival window based on the received input data; identifying, via the one or more hardware processors, a set of potential segments based on the computed look-ahead score and one or more historical scores, wherein the one or more historical scores correspond to one or more historical transactional data, and wherein the historical transactional data comprises at least one of one or more customer behaviors, one or more attributes associated with one or more users, sensitivity associated with an item, and a user propensity toward an item; and mapping each of the plurality of users to at least one potential segment from the set of potential segments.

In an embodiment, the step of mapping each of the one or more users to at least one potential segment from the set of potential segments is performed using a K-means clustering technique.

In an embodiment, the method further comprises receiving, in real-time, a trigger notification associated with one or more users; generating a set of one or more recommended items for the one or more users by eliminating popularity bias based on the received trigger notification, wherein the set of one or more recommended items are generated by eliminating the popularity bias associated with one or more items comprised in an item catalogue; mapping one or more personalized offers to the generated set of one or more recommended items for the one or more users, using a deciphering technique; and determining a set of optimal offers based on the one or more personalized offers.

In an embodiment, the step of mapping the one or more personalized offers to the generated set of one or more recommended items for the one or more users is based on at least one of (i) an offer period, (ii) remaining days left for one or more offers, (iii) a redemption rate, (iv) an item count, (v) an item leftover rate, (vi) a face value of an item, (vii) an offer type, and (viii) an offer description.

In another aspect, there is provided a processor implemented system for personalization of offers. The system comprises: a memory storing instructions; one or more communication interfaces; and one or more hardware processors coupled to the memory via the one or more communication interfaces, wherein the one or more hardware processors are configured by the instructions to: receive an input data comprising information corresponding to a plurality of users, one or more associated transactions, one or more clickstreams associated with one or more items, and one or more offers; compute a look-ahead score for at least one of a potential sale, a likelihood of churning of the plurality of users, and a subsequent user arrival window based on the received input data; identify a set of potential segments based on the computed look-ahead score and one or more historical scores, wherein the one or more historical scores correspond to one or more historical transactional data, and wherein the historical transactional data comprises at least one of one or more customer behaviors, one or more attributes associated with one or more users, sensitivity associated with an item, and a user propensity toward an item; and map each of the plurality of users to at least one potential segment from the set of potential segments.

In an embodiment, each of the one or more users is mapped to at least one potential segment from the set of potential segments using a K-means clustering technique.

In an embodiment, the one or more hardware processors are further configured by the instructions to receive, in real-time, a trigger notification associated with one or more users; generate a set of one or more recommended items for the one or more users by eliminating popularity bias based on the received trigger notification, wherein the set of one or more recommended items are generated by eliminating the popularity bias associated with one or more items comprised in an item catalogue; map one or more personalized offers to the generated set of one or more recommended items for the one or more users, using a deciphering technique; and determine a set of optimal offers based on the one or more personalized offers.

In an embodiment, the one or more personalized offers are mapped to the generated set of one or more recommended items for the one or more users based on at least one of (i) an offer period, (ii) remaining days left for one or more offers, (iii) a redemption rate, (iv) an item count, (v) an item leftover rate, (vi) a face value of an item, (vii) an offer type, and (viii) an offer description.

In yet another aspect, there are provided one or more non-transitory machine-readable information storage mediums comprising one or more instructions which when executed by one or more hardware processors cause personalization of offers by: receiving an input data comprising information corresponding to a plurality of users, one or more associated transactions, one or more clickstreams associated with one or more items, and one or more offers; computing a look-ahead score for at least one of a potential sale, a likelihood of churning of the plurality of users, and a subsequent user arrival window based on the received input data; identifying a set of potential segments based on the computed look-ahead score and one or more historical scores, wherein the one or more historical scores correspond to one or more historical transactional data, and wherein the historical transactional data comprises at least one of one or more customer behaviors, one or more attributes associated with one or more users, sensitivity associated with an item, and a user propensity toward an item; and mapping each of the plurality of users to at least one potential segment from the set of potential segments.

In an embodiment, the step of mapping each of the one or more users to at least one potential segment from the set of potential segments is performed using a K-means clustering technique.

In an embodiment, the one or more instructions which when executed by the one or more hardware processors further cause receiving, in real-time, a trigger notification associated with one or more users; generating a set of one or more recommended items for the one or more users by eliminating popularity bias based on the received trigger notification, wherein the set of one or more recommended items are generated by eliminating the popularity bias associated with one or more items comprised in an item catalogue; mapping one or more personalized offers to the generated set of one or more recommended items for the one or more users, using a deciphering technique; and determining a set of optimal offers based on the one or more personalized offers.

In an embodiment, the step of mapping the one or more personalized offers to the generated set of one or more recommended items for the one or more users is based on at least one of (i) an offer period, (ii) remaining days left for one or more offers, (iii) a redemption rate, (iv) an item count, (v) an item leftover rate, (vi) a face value of an item, (vii) an offer type, and (viii) an offer description.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
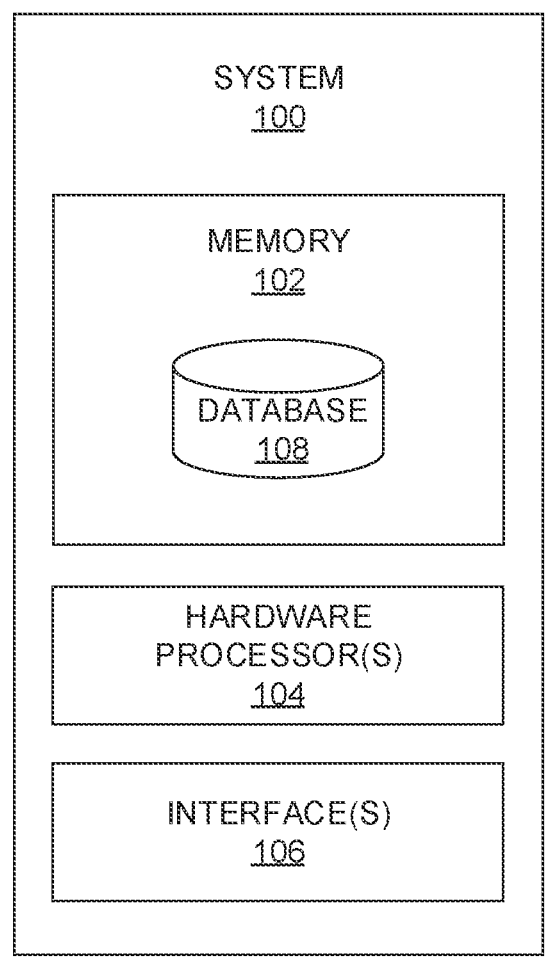
FIG. 1 depicts an exemplary system for performing user segmentation and generating personalized offers for recommendation thereof, in accordance with an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

As mentioned earlier, offers and optimization have co-existed since long and industry has several solutions to address this need. However, identifying the right customer to target offers, assigning the right offer only when customer requires it and presenting offers even on long tail product is crucial to a successful offer assignment. The common problems are described above. However, there are other problems as well. For instance, problem of popularity bias in offer recommendations. Machine learning recommender systems inherently have a bias for popular products and offers are given on best sellers predominantly and perform poorly when recommending less popular products and the related offers. Current solutions use data limited to transaction history alone and do not handle popularity bias in offer assignment, which occur in recommendation algorithms. By eliminating popularity bias, systems and methods of the present disclosure ensure that products in the long tail get visibility and have improved sales whereas the top sellers are anyways purchased without an offer. The long tail strategy aids in bundling up the demand for niche products and increasing the profits by capitalizing on it.

For data-driven marketing having data is key, however high-quality data is not always available. Present disclosure implemented an algorithm that generates personalized offers with limited session data and eliminates popularity bias rampant in traditional recommenders. Offers, therefore, are generated for products including those in the Long Tail for a specific Intent. This improves sales for such products and balances exposure to offers on popular products. While popularity bias is studied for product recommendations it is not applied in the context of offer assignment. The algorithm (refer "https://doi.org/10.1145/3306618.3314309") eliminates popularity bias and it works effectively in offers that include the significant long tail in addition to the popular products with minimal data. Customers who interact with long-tail products are 2.5 times more engaged as per Harvard Business Review (HBR) study. Offer redemptions are a mere 0.66% if 300 Billion coupons according to Statista Coupon trends showing the ineffectiveness of existing systems.

Another problem is having limited optimization capability—Deciphering offer content: The existing optimization methods assign offers to customers based on purchase history, constraints on the number of targeted customers, copies of available offers etc. Method of the present disclosure, in addition to these generic constraints, deciphers each offer description using natural language processing techniques and classifies them into predefined list of offer types and then maps to customer segments. This is an additional constraint which assigns certain offer types to certain customers taking customer interest into consideration. In addition, best offers for the customer are identified using Named Entity Recognition (NER) on offer description and mapped to customer based on their respective propensity scores of customers for attributes like Brand, Category, Price, etc. With limited data cited by retailers, building a solution that takes care of inherent popularity bias and assigning offers keeping in mind the constraints (number of customers assigned to each offer, availability of number of copies of offer, total aggregate budget needed for offers, determining if the customer needs an offer at this point of time) is a challenge. By initially balancing the resultant products and the related offers further optimizing the assignment with constraints ensures that customers receive offers only when required.

Figure 2:
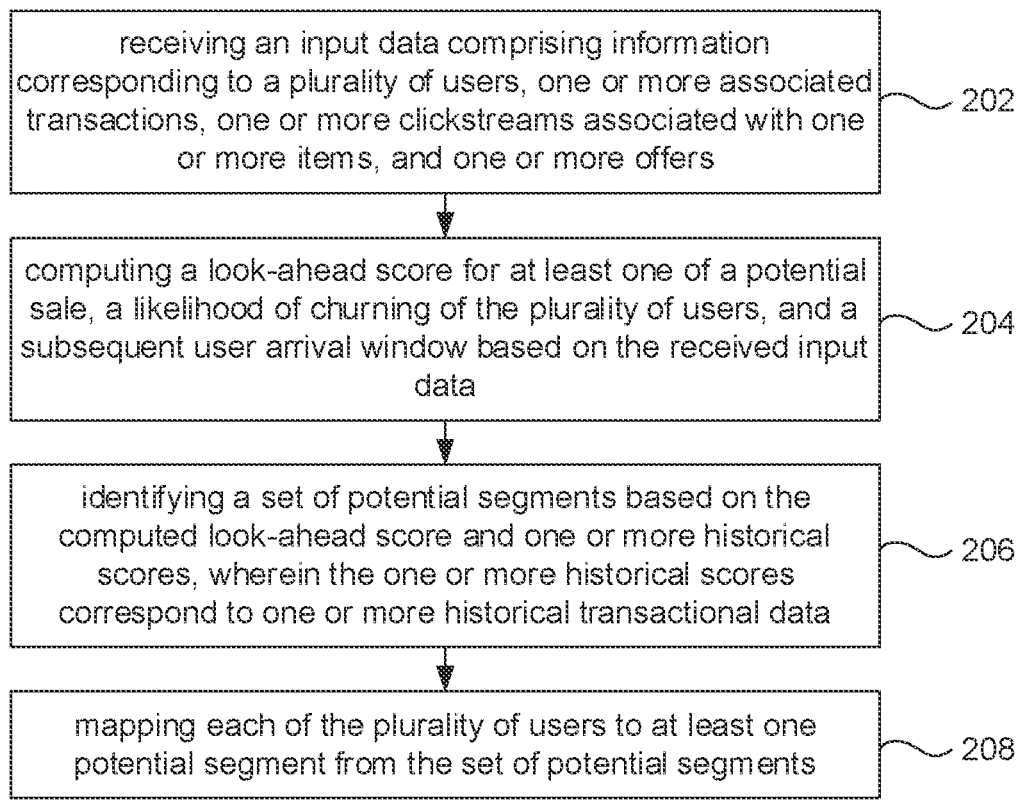
FIG. 2 depicts an exemplary flow chart illustrating a method for user segmentation for personalization of offers thereof, using the system of FIG. 1 in accordance with an embodiment of the present disclosure.
Figure 3:
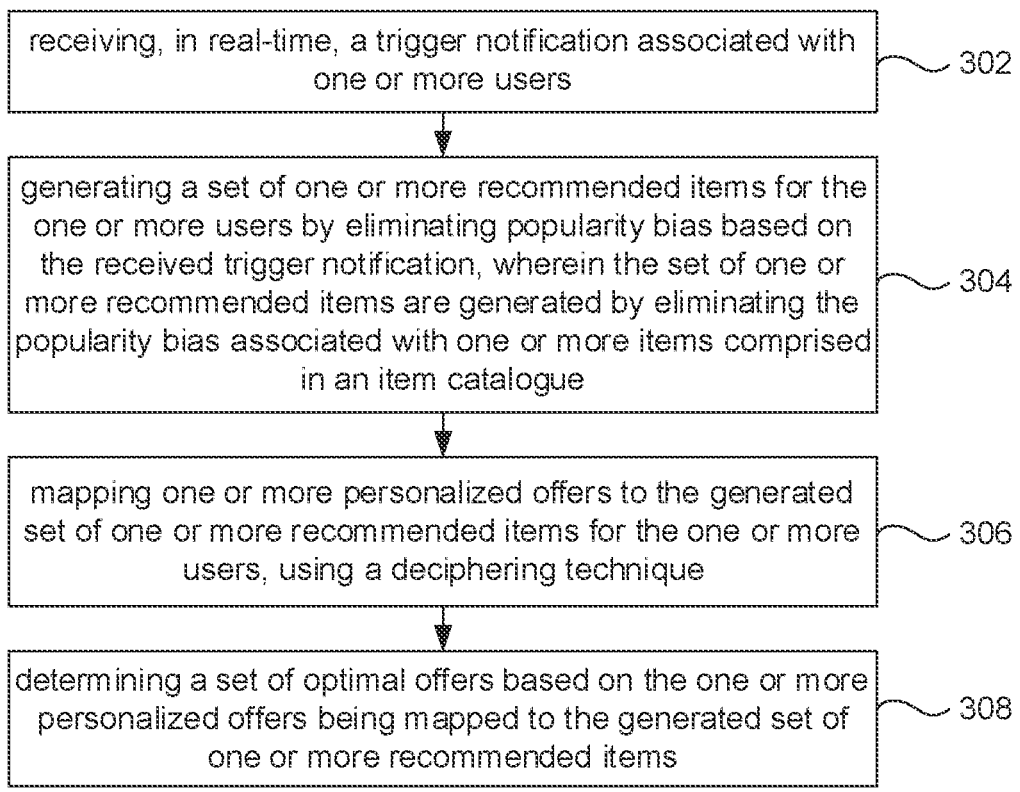
FIG. 3 depicts an exemplary flow chart illustrating a method for personalization of offers for users, using the system of FIG. 1 in accordance with an embodiment of the present disclosure.

Referring now to the drawings, and more particularly to FIGS. 1 through 3, where similar reference characters denote corresponding features consistently throughout the figures, there are shown preferred embodiments and these embodiments are described in the context of the following exemplary system and/or method.

FIG. 1 depicts an exemplary system 100 for performing user segmentation and generating personalized offers for recommendation thereof, in accordance with an embodiment of the present disclosure. In an embodiment, the system 100 may also be referred as personalization system or recommendation system or offer personalization system or offer recommendation system and may be interchangeably used herein. In an embodiment, the system 100 includes one or more hardware processors 104, communication interface device(s) or input/output (I/O) interface(s) 106 (also referred as interface(s)), and one or more data storage devices or memory 102 operatively coupled to the one or more hardware processors 104. The one or more processors 104 may be one or more software processing components and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is/are configured to fetch and execute computer-readable instructions stored in the memory. In an embodiment, the system 100 can be implemented in a variety of computing systems, such as laptop computers, notebooks, hand-held devices (e.g., smartphones, tablet phones, mobile communication devices, and the like), workstations, mainframe computers, servers, a network cloud, and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random-access memory (SRAM) and dynamic-random access memory (DRAM), and/or non-volatile memory, such as read only memory (ROM), erasable programmable ROM, flash memories, hard disks, optical disks, and magnetic tapes. In an embodiment, a database 108 is comprised in the memory 102, wherein the database 108 comprises information related to users, and their shopping/transaction details, and the like. The database 108 further comprises information on look-ahead scores for a potential sale, a likelihood of churning of users, a subsequent user arrival window, and the like. The database 108 further comprises user segmentation information, triggers received from various users in real-time, recommended items for the trigger received in real-time, mapping information pertaining to recommended items and personalized offers, next best offers (or also referred as optimal offers and interchangeably used herein), and the like. The memory 102 further comprises (or may further comprise) information pertaining to input(s)/output(s) of each step performed by the systems and methods of the present disclosure. In other words, input(s) fed at each step and output(s) generated at each step are comprised in the memory 102 and can be utilized in further processing and analysis.

FIG. 2 depicts an exemplary flow chart illustrating a method for user segmentation for personalization of offers thereof, using the system 100 of FIG. 1 in accordance with an embodiment of the present disclosure. In an embodiment, the system(s) 100 comprises one or more data storage devices or the memory 102 operatively coupled to the one or more hardware processors 104 and is configured to store instructions for execution of steps of the method by the one or more processors 104. The steps of the method of the present disclosure will now be explained with reference to components of the system 100 of FIG. 1, and the flow diagram as depicted in FIG. 2.

In an embodiment of the present disclosure, at step 202, the one or more hardware processors 104 receive an input data comprising information corresponding to a plurality of users, one or more associated transactions, one or more clickstreams associated with one or more items, and one or more offers. For instance, input data comprises of most recent session information of user(s) (e.g., say user U) which contains items (e.g., products) clicked in the session along with the corresponding timestamps. In other words, input data comprises s1: [p1, p2, p3 ... pn]:[t1, t2, t3 ... tn], where si represents session, pi represents product id being viewed, and ti represents viewed timestamp. In addition, the offers related information may also be received such as say, 15% off on purchase of product p1, buy 2 product p2 and get 1 product p2 free, and the like. In an embodiment, the term 'customer' and 'user' may be referred as a consumer of an item (e.g., product) and may be interchangeably used herein. One or more clickstreams associated with one or more items may refer to one or more interactions such as clicks associated with one or more items (that may be of interest to user(s), in an e-commerce portal.

In an embodiment of the present disclosure, at step 204, the one or more hardware processors 104 compute a look-ahead score for at least one of a potential sale, a likelihood of churning of the plurality of users, and a subsequent user arrival window based on the received input data.

The look-ahead score (also referred as futuristic score and interchangeably used herein) for the potential sale, and the likelihood of churning of the plurality of users (also referred as churn probability and interchangeably used herein) is described by way of following illustrative description:

Sales Potential (SP) and Churn Probability (CP): Sales potential and churn probability of the customer are calculated simultaneously using a deep neural network (e.g., neural network as known in the art). The input to the neural network is from an analytics warehouse wherein the neural network is trained using features derived from various sources such as customer, product, clickstream, transactions, offers, and the like. A supervised regression model (as known in the art regression model) is used for predicting sales potential by ingesting all the different customer attributes and features along with the interactions. The outputs from the regression model are described as below:

Output:

Regression target value is the Sales potential: Total Purchase amount for each customer in a fixed time-period after the first purchase. The model predicts the probability of customers returning which provided the churn likelihood and provides the customers sales potential (e.g., refer "Churn and Sales potential prediction is there in a research paper. https://arxiv.org/pdf/1912.07753.pdf"). In the present disclosure, the system 100, used customer features to enhance it further. The customer features include, but are not limited to, 1) Customer demographics, Recency, Frequency, Monetary, 2) Temporal features like days between last n and n−1 purchases 3) Aggregated features like avg purchase value, in an embodiment of the present disclosure.

Below is a description that discusses the computation of subsequent user arrival window of the users:

Customer next arrival window: Customer next arrival window (also referred as subsequent user arrival window) is predicted using a LightGBM (e.g., also referred as Light Gradient Boosting Machine and interchangeably used herein) model which is an ensembling supervised classifier model. The model is trained using a customer profile which is built using the customer's temporal transactional and behavioral features and the static features. The model predicts when the customer will arrive and purchase products in future.

Classification target value for training the model: The time in which the customer has arrived next after the training period.

Model predicts the time period for each customer in future on when they will arrive on a digital platform (e.g., e-commerce portal) based on when they have historically visited the channel along with the contextual information including seasons and trends.

Output: Likelihood of the customer arriving in the purchase channel in different time periods starting from 1-7 days, 7-14 days until 21-28 days which is four weeks.

In an embodiment of the present disclosure, at step 206, the one or more hardware processors 104 identify a set of potential segments based on the computed look-ahead score and one or more historical scores, wherein the one or more historical scores correspond to one or more historical transactional data. In an embodiment, the one or more historical transactional data comprises at least one of one or more customer behaviors, one or more attributes associated with one or more users, sensitivity associated with an item, and a user propensity toward an item. In an embodiment of the present disclosure, at step 208, the one or more hardware processors 104 map each of the plurality of users to at least one potential segment from the set of potential segments.

The above steps 206 and 208 are better understood by way of following description and non-construing examples:

The historical score computation is described by way of following illustrative example:

Historic scores: The historical attributes aid in arriving at four (4) scores:

1. Shopping habits (SH) is defined as the Recency, Frequency, Monetary (RFM) score of the customer; wherein Recency refers to number of days since last purchase/engagement, Frequency is the total no. of purchases/clicks/duration on digital platform, and Monetary is the total amount spent by the customer.

$SH$=Normalized $R*F*M$ $1<=SH<=5$

R=Recency refers to number of days since last purchase/engagement
F=Frequency is the total no. of purchases/clicks/duration
M=Monetary is the total amount spent by the customer.

2. Price sensitivity (PS): This is defined as the scale (1-5) in which the customer is sensitive to the price of the products. Higher the score, higher the customer evaluates the price of products that he/she is interested in.

PS=Normalized (No. of products bought on discount/Total No. of products bought) PS is normalized between 1 and 5

$1<=PS<=5$

3. Brand/category propensity (BP/CP), also referred as user propensity toward an item, is defined as the propensity score of the customer towards any brand or category of the products. The score is on a scale 1 to 5. The score is calculated using the customer's historic purchases and behavior.

Brand Propensity (BP)=No. of products bought/engaged in Brand 'x'/Total no. of products bought/engaged.

$1<=BP<=5$

Category Propensity (CP)=No. of products bought/engaged in Category 'y'/Total no. of products bought/engaged.

$1<=CP<=5$

4. Promo buying (PB) is calculated using the customer's affinity towards promotions and campaigns. Higher the score higher the tendency to buy in promotions.

PB: Normalized (Frequency of purchases during a sale period/Frequency of purchases)

$1<=PB<=5$

Input to user/customer segmentation is depicted in below Table 1:

TABLE 1

| Users | SH | PS | BP | CPro | PB | SP | CP | AW |
|---|---|---|---|---|---|---|---|---|
| User 1 | 4 | 1 | 5 | 4 | 1 | 140 | 0.2 | 2 |
| User 2 | 2 | 4 | 2 | 2 | 4 | 70 | 0.6 | 6 |

SH: shopping habit, PS: Price sensitivity, BP: Brand Propensity, CPro: Category Propensity, PB: Promo Buyer, SP: Sales Potential, CP: Churn Probability, AW: Arrival window (in weeks).

Customer segmentation (or user segmentation) is done using k-means clustering (or any other clustering technique as known in the art) which takes the output of the sales potential, churn, and next purchase window prediction models along with the historical scores and predefined lifecycle segments of the customer to generate various customer types/segments. K-means algorithm identifies k number of centroids, and then allocates every data point/customer to the nearest segment, while keeping the centroids as small as possible, where k is the no. of segments. Based on the data, the number of segments is determined, and the customer groups identified. Below Table 2 depicts an exemplary user/customer segmentation:

TABLE 2

| User_ID | User_type |
|---|---|
| User 1 (U_1) | Segment 1 |
| User 2 (U_2) | Segment 2 |
| User 3 (U_3) | Segment 3 |
| User 4 (U_4) | Segment 4 |
| User 5 (U_5) | Segment 5 |
| User 6 (U_6) | Segment 6 |

FIG. 3, with reference to FIGS. 1 through 2, depicts an exemplary flow chart illustrating a method for personalization of offers for users, using the system 100 of FIG. 1 in accordance with an embodiment of the present disclosure. Once the user/customer segmentation is done, at step 302 of the present disclosure, the one or more hardware processors 104 receive, in real-time, a trigger notification associated with one or more users.

In an embodiment, at step 304 of the present disclosure, the one or more hardware processors 104 generate a set of one or more recommended items for the one or more users by eliminating popularity bias based on the received trigger notification. The set of one or more recommended items are generated based on an elimination of the popularity bias associated with one or more items comprised in an item catalogue, in an example embodiment of the present disclosure.

In an embodiment, at step 306 of the present disclosure, the one or more hardware processors 104 map one or more personalized offers to the generated set of one or more recommended items for the one or more users, using a deciphering technique. In an embodiment of the present disclosure, the one or more personalized offers are mapped to the generated set of one or more recommended items for the one or more users based on at least one of (i) an offer period, (ii) remaining days left for one or more offers, (iii) a redemption rate, (iv) an item count, (v) an item leftover rate, (vi) a face value of an item, (vii) an offer type, and (viii) an offer description.

In an embodiment, at step 308 of the present disclosure, the one or more hardware processors 104 determine a set of optimal offers based on the one or more personalized offers being mapped to generated set of one or more recommended items. The above steps of 302 through 308 are better understood by way of following examples and description:

There could be scenarios wherein the trigger notification may be either received from existing users of an e-commerce portal or a new user of the portal. Such scenarios are further elaborated in detail as described below:

All customers/users: When an existing customer generates a trigger, the most recent clickstream (products clicked and the corresponding timestamps) is captured and fed into the system 100. The system 100 learns the item and session embeddings using a graph neural network and generates top-N products and their scores eliminating popularity bias. The product scores and converted to offer scores using a Product-Offer mapper which a) maps offers applicable to the products recommended b) generates offer scores using (i) an offer period, (ii) remaining days left for one or more offers, (iii) a redemption rate, (iv) an item count, (v) an item leftover rate and (vi) a face value of an item.

Existing customer (also referred as existing user and interchangeably used herein): The offer list coming out of Product Offer Mapper is personalized using a combination of NLP techniques which include BERT, NER and Attribute propensity models. The personalized offers are further optimized using Optimization layer wherein the existing customer is compared against the customers in other Customer segments to get final assignment of Personalized and Optimized offers.

New/unknown customer (also referred as new user and interchangeably used herein): The offer list coming out of Product Offer Mapper is personalized using a combination of Customer Segmentation and natural language processing (NLP) techniques which include Bidirectional Encoder Representations from Transformers (BERT), Named Entity Recognition (NER) and Attribute propensity models as known in the art. The customer segmentation technique as implemented herein maps the unknown/new users into default segment 'Prospect/Suspect' based on the behavior on the e-commerce portal (e.g., say ABC product portal which lists all sort of items for purchase and transactions). The personalized offers are further optimized using Optimization layer to get final assignment of Personalized and Optimized offers. The system 100 and the real time recommendations, product offer mapper are not reliant on whether the customer is known or unknown but rather rely on the current session behavior and possibly the previous session inputs and contextual data such as location and other temporal aspects that are available. Segmentation which operates on the known customers is utilized in the optimization layer and not in the initial propensity generation and assignment for ensuring the right offer assignment. The above steps 302 through 308 are better understood by way of following examples:

Assuming, mapping of each customer to a segment type is already carried out, say as example below:
<c1: 'prospect', c2:'new', c3:'active' . . . cn:'repeat'>

Now, when a trigger from Customer c1's touchpoint is generated, Customer is identified and is hit against clickstream database to get his most recent product clicks—C1: <p1, p9, p6, p8, p3, p4, p0, p2, p5, p7>

Number of clicked products=10

The system 100 then generates top N product recommendations, wherein N=10.

Recommended products: C1: <p11, p29, p16, p38, p13, p42, p10, p21, p15, p27>

The system 100 then invokes a product offer mapper (comprised in the memory 102): Picks the offers applicable on the recommended products
c1: <o11, o29, o16, o38, o42, o10, o21, o15>

As mentioned above, the one or more personalized offers are mapped to the generated set of one or more recommended items for the one or more users based on at least one of (i) the offer period, (ii) remaining days left for one or more offers, (iii) the redemption rate, (iv) the item count, (v) the item leftover rate, (vi) the face value of the item, (vii) the offer type, and (viii) the offer description.

Scoring mechanism: Product propensity scores generated by the system 100 and converted to offer propensity scores based on a scoring mechanism. The system 100 identified offer specific features which contribute towards calculating offer propensities. Below Table 3 depicts examples of these attributes used for mapping personalized offers to recommended items.

TABLE 3

| Features | Calculation |
|---|---|
| Offer period | No. of days between start and end date |
| Offer days left | No. of days between current date and end date |
| Redemption rate | Total no. of redemptions/Total no. of available coupons |
| Product count | Number of products the offer can applied |
| Product leftover rate | Product count/Products left over |
| Face value | Face value of offer |

Example offer details are mentioned in below Table 4:

TABLE 4

| Offer | Offer start date | Offer end date | Offer days left (consider current date) | Redemption rate | Product count | Product leftover rate | Face value |
|---|---|---|---|---|---|---|---|
| Offer 1 | 1 Jan. 2022 | 30 Jan. 2022 | 13 | 0.7 | 10 | 50 | 10$ |
| Offer 2 | 1 Jan. 2022 | 20 Jan. 2022 | 3 | 0.5 | 5 | 25 | 50$ |

Calculation of the offers (last) column is shown in below Table 5

TABLE 5

| Feature | Logic | Relative weighting | Offer calculation of weights for example offers |
|---|---|---|---|
| Offer period | No. of days between start and end date | Inversely proportional weights to feature values for (compared with all offer periods) | offer 1: <offer period: 30>, <offer period weight: 0.1>, offer 2: <offer period: 20>, <offer period weight: 0.5>, offer n: <offer period: 10>, <offer period weight: 1>, Highest weightage for minimum offer period value Lowest weightage for maximum offer period value |
| Offer days left | No. of days between current date and end date | Inversely proportional weights to feature values for (compared with all offer days left) | offer1: <offer days left: 13>, <offer days left weight: 0.1>, offer 2: <offer days left: 3>, <offer days left weight: 0.5>, offer n: <offer days left: 1>, <offer days left weight: 1>, Highest weightage for minimum offer days left value Lowest weightage for maximum offer days left value |
| Redemption rate | Total no. of redemptions/Total no. of available coupons | Directly proportional weights to feature values for (compared with all offer redemption rates) | offer1: <redemption rate: 0.7>, <redemption rate weight: 1>, offer 2: <redemption rate: 0.5>, <redemption rate weight: 0.5>, offer n: <redemption rate: 0.1>, <redemption rate weight: 0.1>, Highest weightage for maximum redemption rate value Lowest weightage for minimum redemption rate value |
| Product count | Number of products the offer can be applied | Inversely proportional weights to feature values for (compared with all Product counts) | "offer1: <Product count: 10>, <Product count weight: 0.1>, offer 2: <Product count: 5>, <Product count weight: 0.5>, offer n: <Product count: 1>, <Product count weight: 1>, Highest weightage for minimum Product leftover rate value Lowest weightage for maximum Product leftover rate value" |
| Product leftover rate | Product count/ Products left over | Inversely proportional weights to feature values for (compared with all Product leftover rates) | "offer1: <Product leftover rate: 50>, <Product leftover rate weight: 0.1>, offer 2: <Product leftover rate: 25>, <Product leftover rate weight: 0.5>, offer n: <Product leftover rate: 1>, <Product leftover rate weight: 1>, Highest weightage for minimum Product leftover rate value Lowest weightage for maximum Product leftover rate value" |
| Face value | Face value of offer | Directly proportional weights to feature values for (compared with all face values) | "offer1: <face value: 10$>, <face value weight: 0.1>, offer 2: <face value: 50$>, <face value weight: 0.5>, |

TABLE 5-continued

| Feature | Logic | Relative weighting | Offer calculation of weights for example offers |
|---|---|---|---|
| | | | offer n: <face value: 100$>, <face value weight: 1>, Highest weightage for minimum face value Lowest weightage for maximum face value |

As mentioned above, feature weights are calculated based on relative weighting, and offer score calculation for each offer is computed as below:

Offer score for each Offer=Average((Offer period*offer period weight)+(Offer days left*Offer days left weight)+(Redemption rate*Redemption rate weight)+(Product count*Product count weight)+(Face value*Face value weight)+(Product leftover rate*Product leftover weight)).

Example of relative scoring:

Offer score1: ((30*0.1)+(13*0.1)+(0.7*1)+(10*0.1)+(50*0.1)+(1*0.1))/6=1.85

Offer score2: ((20*0.5)+(3*0.5)+(0.5*0.5)+(5*0.5)+(25*0.5)+(5*0.5))/6=4.87

The customer has a higher propensity and better fit for the Offer2.

Offer content are identified along with offer type and mapped to customer based on entity propensities. More particularly, offers which have high propensities are mapped.

c1: <o11, o38, o15, o21,>

Further, the optimal offers (also referred as next optimal offers and interchangeably used herein) are identified based on the personalized offers mapped to the recommended items, wherein optimization includes assigning offers to customer considering the financial constraints and based on customers in other segments. The next optimal offers are generated based on one or more configurable constraints. The configurable constraints, include but are not limited to, number of customers assigned to each offer, availability of number of copies of offer, total aggregate budget needed for offers, determining if the customer needs an offer at this point of time, and the like, in an embodiment of the present disclosure. Below Table 6 depicts generation/identification of optimal/next best offers for recommendation to users based on personalized offers mapped to the recommended items set.

TABLE 6

| Propensity matrix | Offer o11 | Offer o38 | Offer o15 | Offer o21 | Offer o16 |
|---|---|---|---|---|---|
| Customer 1 | 0.98 | 0.74 | 0.56 | 0.75 | 0.21 |
| Customer 2 | 0.57 | 0.81 | 0.01 | 0.28 | 0.83 |
| Customer N | 0.86 | 0.11 | 0.03 | 0.83 | 0.72 |

Each value in the matrix is customer offer propensity score derived from product offer mapper. Therefore, the final output, herein next best offers/optimal offers are o11, o21 and o74 that are recommended to Customer 1.

Typical real time algorithms for recommendations tend to generate recommendations for popular products and offers. The method and system of the present disclosure address popularity bias in offer recommendation, which effectively ensures even offers with long tail products are recommended. Deciphering content using natural language programming techniques have not been explored so far in the field of offer assignment. Deciphering offers along with relevant mapping to customer segment would ensure that customer intent/preferences are captured and just the right offer is assigned. The combination of handling popularity bias, deciphering offer and mapping to the customer segment makes it a unique approach. It is hard to replicate the method described herein as the logic on how to personalize, optimize and assign offers in real time involves a lot of domain knowledge on customer life cycle and personalization along with data science and technology expertise to deliver offers at scale.

Ensuring customers receive the right offers at the right time, balancing the retailer margins versus preserving the customer experience and loyalty is the core aspect of this perfect offer personalization solution as implemented by the present disclosure. Enabled by Deep learning models requiring minimal breadth of data to personalized offers, further optimizing for constraints and real time delivery is the core capability of the system 100 of FIG. 1. The method implemented by the present disclosure describes various steps that next best offers to the customer touchpoint, wherein the steps involve identifying the set of potential customer segments which comprises of the following steps: identifying the customer type based on his/her purchase history, navigation/behavior through ecommerce digital portal and demography. The attributes that go into the customer segmentation from the analytics warehouse are categorized into two: 1) Historical scores: The historical attributes aid in arriving at scores for the shopping habits (SH), price sensitivity (PS), brand/category propensity (BP/CPro), Promo buying (PB) tendencies of the customers. Shopping habits (SH) is defined as the Recency, Frequency, Monetary (RFM) score of the customer; wherein Recency refers to number of days since last purchase/engagement, Frequency is the total no. of purchases/clicks/duration on digital platform, Monetary is the total amount spent by the customer. Price sensitivity (PS) is defined as the scale (1-5) in which the customer is sensitive to the price of the products. Higher the score, higher the customer evaluates the price of products that he is interested in. Brand/category propensity (BP/CPro) is defined as the propensity score of the customer towards any brand or category of the products. The score is on a scale 1 to 5. The score is calculated using the customer's historic purchases and behavior. Promo buying (PB) is calculated using the customer's affinity towards promotions and campaigns. Both scores are between 1 and 5; higher the score higher the tendency to buy in full price/promotions. 2) Futuristic scores: Apart from these scores based on historically available data, futuristic scores like sales potential (SP), likelihood of churn and customer next purchase window have been used as inputs to identify the potential customer segments. These three scores are calculated using machine learning/deep learning models as described: Sales potential and churn probability of the customer are calculated using a deep probabilistic model which takes input from the analytics warehouse and neural network is trained using the features derived from various databases like customer, product, clickstream, transactions and offers. The model predicts the probability of returning customers and their sales potential. Customer next purchase window is predicted using a LightGBM model which is an ensembling supervised classifier model. The model is trained using a customer profile which is built using the customer's temporal transactional and behavioral features and the static features. The model predicts when the customer will arrive and purchase products in future. Customer segmentation is done using k-means clustering which takes the output of the sales potential, churn, and next purchase window prediction models along with the historical scores and segments the customer into various customer types/segments. For e.g., if a customer is engaged with the ecommerce platform and have not done any purchases yet, can be tagged to 'prospect/suspect' customer type/segment. Customer segments are generated based on the customer lifecycle staging.

When a trigger is generated from a customer touchpoint: Recommendation algorithm comprised in the memory 102 (not shown in FIGS.) is invoked by the system 100 which generates top-N product recommendations using customer's most recent product clicks in the retailer's e-commerce portal. The recommendation algorithm used is Normalized Item and Session representations (NISER) (e.g., refer Patent Application 201921035120 titled "SYSTEM AND METHOD FOR HANDLING POPULARITY BIAS IN ITEM RECOMMENDATIONS") which inherently eliminates popularity bias which exists normally in recommender systems. The NISER (also referred as the system 100 or recommendation system and interchangeably used herein) which makes use of Graph neural network (GNN), can learn useful representations customer's product clicks in a session, removes the bias towards popular items, and thereby recommends relevant long-tail items (less frequent items). The recommendation system further predicts next best product list including Non popular products. The NISER is extended in predicting next best offer list using a 'Product-Offer' mapper. The mapping and identification of best offers for a user may include mapping offers to personalized products that result in recommending personalized offers which are of interest to the customer. The offer content is deciphered using Bidirectional Encoder Representations from Transformers (BERT), which is state of the art language model for NLP, and each offer is classified into a predefined list of offer types and mapped to customer segments. The best offer is determined using Named Entity Recognition on offer content and mapping to customer based on his/her attribute propensities. Different offer types like percentage discounts, multi-buys, Buy-One-Get-One (BOGO), etc. are tagged under different names and content in different campaigns. A class of natural language programming techniques is used to decipher the offer content and classify them into different offer types such as BOGO, percentage discounts, free shipping, first purchase discounts, multi-buys, gift card discounts, etc. The classified offer types are then mapped to different customer segments. For instance, a prospect customer segment wherein the customers have very less engagement and no purchases with the retailer yet, can be encouraged to introduce to products from the retailer by mapping 'offers worth xx$ on first purchase' to that segment. The best offers out of all offers in a particular offer type assigned to customer, are determined using NER (Named Entity Recognition) techniques for attributes like Brand, Category, Price, etc.

The customer offer type mapper happens wherein each offer content is mapped to an offer type which in turn is mapped to a predefined list of customer types. For instance, offer content "Company X Smart phone on 10% discount on your first purchase' mapped to 'First purchase' offer type and then to 'Prospect/Suspect' customer based on lifecycle segmentation. The NER map each entity of the offer content to a list of predefined names like Brand, Category, Percentage of Discount, Price range, etc. For instance, offer content 'Company X Smart phone on 10% discount on your first purchase': {'Company X: Brand, phone: Category, 10%: Discount}. Further, Customer preferences-based offer mapping is carried out, wherein based on the Brand, Category and Price propensities of each customer, right offers are mapped. For instance, Customer-Attribute propensity {customer id: Attribute: Attribute name: propensity}, {Customer id: Brand: Apple: 0.85, Customer id: Category: Mobile Phone: 0.76}, if score>threshold, then assign "Company X phone on 10% discount on your first purchase' to customer of type 'Prospect/Suspect'.

The offers are further optimization to deliver optimal offers or next best offers to users. More specifically, in the present disclosure, the system and method described herein investigated the constrained assignment problem wherein a set of offers are to be assigned to a set of customers. There are both constraints on the number of available copies for each offer and the number of offers one customer can get. To measure the assignment gain, a score is computed for each customer-offer pair, quantifying how beneficial it is if assigning this customer this offer. Additionally, one customer can get at most one copy of the same offer. The objective is to optimize the assignment so that the global benefits are maximized. The system 100 may view the assignment process as an auction game. Customers take turns to bid their favorite offers based on the corresponding scores (values). The offers then have prices from the bids they received. As the auction proceeds, the customer adjusts their favorite offers according to the current offer values. This is an iterative process. In each iteration, a customer computes her current best offers. The current value of an offer to a customer is defined as the difference of that customer's score to the offer and the price of the offer. Then she orders them and starts bidding through from the best one. The available number of copies of the personalized offers identified through deciphering of offers are then passed to optimization layer along with the potential customer base other than the customer's segment.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, comprising:
receiving, via one or more hardware processors, an input data comprising information corresponding to a plurality of users, one or more associated transactions, one or more clickstreams associated with one or more items, and one or more offers;
computing, via the one or more hardware processors, a look-ahead score for at least one of a potential sale, a likelihood of churning of the plurality of users, and a subsequent user arrival window based on the received input data;
identifying, via the one or more hardware processors, a set of potential segments based on the computed look-ahead score and one or more historical scores, wherein the one or more historical scores correspond to one or more historical transactional data;
mapping, via the one or more hardware processors, each of the plurality of users to at least one potential segment from the set of potential segments;
receiving, in real-time, a trigger notification associated with one or more users;
generating a set of one or more recommended items for the one or more users by eliminating popularity bias based on the received trigger notification, wherein the set of one or more recommended items are generated by eliminating the popularity bias associated with one or more items comprised in an item catalogue and upon generating the trigger notification, one or more recent clickstream products are captured and fed into a system;
learning the set of one or more recommended items and session embeddings using a graph neural network and generating top-N products, wherein product scores are converted to offer scores using a Product-Offer mapper which a) maps offers applicable to the products recommended b) generates offer scores using (i) an offer period, (ii) remaining days left for one or more offers, (iii) a redemption rate, (iv) an item count, (v) an item leftover rate and (vi) a face value of an item;
mapping one or more personalized offers to the generated set of one or more recommended items for the one or more users, using a deciphering technique, which deciphers each offer description using Natural Language Processing techniques and classifies them into predefined list of offer types and then maps to customer segments, wherein an offer list coming out of the Product-offer mapper is personalized using a combination of the Natural Language Processing (NLP) techniques, the NLP techniques being at least one of Bidirectional Encoder Representations from Transformer (BERT), Named Entity Recognition (NER) and attribute propensity models, and the one or more personalized offers are further optimized using an optimization layer, wherein an existing customer is compared against customers in the customer segments to obtain a final assignment of the one or more personalized offers and optimized offers ;
determining a set of optimal offers based on the one or more personalized offers being mapped to the generated set of one or more recommended items, wherein sales potential of the one or more users are calculated using a deep probabilistic model which obtains input from an analytics warehouse and a neural network is trained using features derived from one or more databases; and
predicting a probability of returning customers and the sales potential, wherein a customer next purchase window is predicted using a LightGBM model and training the LightGBM model using a customer profile that is built using at least one of temporal transactional, behavioral features and static features of the one or more users.

2. The processor implemented method of claim 1, wherein the historical transactional data comprises at least one of one or more customer behaviors, one or more attributes associated with one or more users, sensitivity associated with an item, and a user propensity toward an item.

3. The processor implemented method of claim 1, wherein the step of mapping each of the one or more users to at least one potential segment from the set of potential segments is performed using a K-means clustering technique.

4. The processor implemented method of claim 1, wherein the step of mapping the one or more personalized offers to the generated set of one or more recommended items for the one or more users is based on at least one of (i) an offer period, (ii) remaining days left for one or more offers, (iii) a redemption rate, (iv) an item count, (v) an item leftover rate, (vi) a face value of an item, (vii) an offer type, and (viii) the offer description.

5. A system, comprising:
a memory storing instructions;
one or more communication interfaces; and
one or more hardware processors coupled to the memory via the one or more communication interfaces, wherein the one or more hardware processors are configured by the instructions to:
receive an input data comprising information corresponding to a plurality of users, one or more associated transactions, one or more clickstreams associated with one or more items, and one or more offers;
compute a look-ahead score for at least one of a potential sale, a likelihood of churning of the plurality of users, and a subsequent user arrival window based on the received input data;
identify a set of potential segments based on the computed look-ahead score and one or more historical scores, wherein the one or more historical scores correspond to one or more historical transactional data;
map each of the plurality of users to at least one potential segment from the set of potential segments;
receive, in real-time, a trigger notification associated with one or more users;
generate a set of one or more recommended items for the one or more users by eliminating popularity bias based on the received trigger notification, wherein the set of one or more recommended items are generated by eliminating the popularity bias associated with one or more items comprised in an item catalogue and upon generating the trigger notification, one or more recent clickstream products are captured and fed into a system;
learning the set of one or more recommended items and session embeddings using a graph neural network and generating top-N products, wherein product scores are converted to offer scores using a Product-Offer mapper which a) maps offers applicable to the products recommended b) generates offer scores using (i) an offer period, (ii) remaining days left for one or more offers, (iii) a redemption rate, (iv) an item count, (v) an item leftover rate and (vi) a face value of an item;
map one or more personalized offers to the generated set of one or more recommended items for the one or more users, using a deciphering technique, which deciphers each offer description using Natural Language Processing techniques and classifies them into predefined list of offer types and then maps to customer segments, wherein an offer list coming out of the Product-Offer mapper is personalized using a combination of the Natural Language Processing (NLP) techniques, the NLP techniques being at least one of Bidirectional Encoder Representations from Transformer (BERT), Named Entity Recognition (NER) and attribute propensity models, and the one or more personalized offers are further optimized using an optimization layer, wherein an existing customer is compared against customers in the customer segments to obtain a final assignment of the one or more personalized offers and optimized offers;
determine a set of optimal offers based on the one or more personalized offers being mapped to the generated set of one or more recommended items, wherein sales potential of the one or more users are calculated using a deep probabilistic model which obtains input from an analytics warehouse and a neural network is trained using features derived from one or more databases; and
predict a probability of returning customers and the sales potential, wherein a customer next purchase window is predicted using a LightGBM model and training the LightGBM model using a customer profile that is built using at least one of temporal transactional, behavioral features and static features of the one or more users.

6. The system of claim 5, wherein the historical transactional data comprises at least one of one or more customer behaviors, one or more attributes associated with one or more users, sensitivity associated with an item, and a user propensity toward an item.

7. The system of claim 5, wherein each of the one or more users are mapped to at least one potential segment from the set of potential segments using a K-means clustering technique.

8. The system of claim 5, wherein the one or more personalized offers are mapped to the generated set of one or more recommended items for the one or more users based on at least one of (i) an offer period, (ii) remaining days left for one or more offers, (iii) a redemption rate, (iv) an item count, (v) an item leftover rate, (vi) a face value of an item, (vii) an offer type, and (viii) the offer description.

9. One or more non-transitory machine-readable information storage mediums comprising one or more instructions which when executed by one or more hardware processors cause personalization of offers by:
receiving an input data comprising information corresponding to a plurality of users, one or more associated transactions, one or more clickstreams associated with one or more items, and one or more offers;
computing a look-ahead score for at least one of a potential sale, a likelihood of churning of the plurality of users, and a subsequent user arrival window based on the received input data;
identifying a set of potential segments based on the computed look-ahead score and one or more historical scores, wherein the one or more historical scores correspond to one or more historical transactional data;
mapping each of the plurality of users to at least one potential segment from the set of potential segments;
receiving, in real-time, a trigger notification associated with one or more users;
generating a set of one or more recommended items for the one or more users by eliminating popularity bias based on the received trigger notification, wherein the set of one or more recommended items are generated by eliminating the popularity bias associated with one or more items comprised in an item catalogue and upon generating the trigger notification, one or more recent clickstream products are captured and fed into a system;

learning the set of one or more recommended items and session embeddings using a graph neural network and generating top-N products, wherein product scores are converted to offer scores using a Product-Offer mapper which a) maps offers applicable to the products recommended b) generates offer scores using (i) an offer period, (ii) remaining days left for one or more offers, (iii) a redemption rate, (iv) an item count, (v) an item leftover rate and (vi) a face value of an item;

mapping one or more personalized offers to the generated set of one or more recommended items for the one or more users, using a deciphering technique, which deciphers each offer description using Natural Language Processing techniques and classifies them into predefined list of offer types and then maps to customer segments, wherein an offer list coming out of the Product-Offer mapper is personalized using a combination of the Natural Language Processing (NLP) techniques, the NLP techniques being at least one of Bidirectional Encoder Representations from Transformer (BERT), Named Entity Recognition (NER) and attribute propensity models, and the one or more personalized offers are further optimized using an optimization layer, wherein an existing customer is compared against customers in the customer segments to obtain a final assignment of the one or more personalized offers and optimized offers; and determining a set of optimal offers based on the one or more personalized offers being mapped to the generated set of one or more recommended items, wherein sales potential of the one or more users are calculated using a deep probabilistic model which obtains input from an analytics warehouse and a neural network is trained using the features derived from one or more databases; and predicting a probability of returning customers and the sales potential, wherein a customer next purchase window is predicted using a LightGBM model and training the LightGBM model using a customer profile that is built using at least one of temporal transactional, behavioral features and static features of the one or more users.

10. The one or more non-transitory machine-readable information storage mediums of claim 9, wherein the historical transactional data comprises at least one of one or more customer behaviors, one or more attributes associated with one or more users, sensitivity associated with an item, and a user propensity toward an item.

11. The one or more non-transitory machine-readable information storage mediums of claim 9, wherein the step of mapping each of the one or more users to at least one potential segment from the set of potential segments is performed using a K-means clustering technique.

12. The one or more non-transitory machine-readable information storage mediums of claim 9, wherein the step of mapping the one or more personalized offers to the generated set of one or more recommended items for the one or more users is based on at least one of (i) an offer period, (ii) remaining days left for one or more offers, (iii) a redemption rate, (iv) an item count, (v) an item leftover rate, (vi) a face value of an item, (vii) an offer type, and (viii) the offer description.

* * * * *